United States Patent [19]

Oura

[11] Patent Number: 5,734,549
[45] Date of Patent: Mar. 31, 1998

[54] DISK DRIVE UNIT FOR A MAGNETIC DISK SYSTEM

[75] Inventor: Norihiro Oura, Tokyo, Japan

[73] Assignee: NEC Corporation, Tokyo, Japan

[21] Appl. No.: 617,403

[22] Filed: Mar. 18, 1996

[30] Foreign Application Priority Data

Mar. 23, 1995 [JP] Japan ................... 7-063635

[51] Int. Cl.$^6$ .................. G06F 1/16; H05K 7/04
[52] U.S. Cl. .............. 361/685; 361/736; 439/377
[58] Field of Search ................. 361/684, 685, 361/686, 729, 730, 732, 736, 728, 788, 803, 733; 439/377, 61, 62, 64; 307/150

[56] References Cited

U.S. PATENT DOCUMENTS

| | | | |
|---|---|---|---|
| 4,401,351 | 8/1983 | Record | 439/61 |
| 4,945,448 | 7/1990 | Bremenour et al. | 361/684 |
| 4,967,311 | 10/1990 | Ferchau et al. | 361/685 |
| 5,222,897 | 6/1993 | Collins et al. | 439/157 |
| 5,269,698 | 12/1993 | Singer | 439/157 |
| 5,277,615 | 1/1994 | Hastings et al. | 439/377 |

FOREIGN PATENT DOCUMENTS 1-319194 12/1989 Japan .

*Primary Examiner*—Lynn D. Feild
*Attorney, Agent, or Firm*—Foley & Lardner

[57] ABSTRACT

For providing a detachable disk drive unit mounted in a magnetic disk sysyem of a high reliability and a practical use which enables miniaturization of the magnetic disk system with high packaging density, the chassis of the disk drive unit consists of a printed circuit board supporting a disk drive and a power circuit and their accessaries. The printed circuit board with a plug-in connector is fitted in or removed from a rack of the magnetic disk system with a lever provided at its front end, and the plug-in connector is joined with a connector at the bottom of the rack when the disk drive unit is mounted in the rack.

1 Claim, 5 Drawing Sheets

5,734,549

DISK DRIVE UNIT FOR A MAGNETIC DISK SYSTEM

BACKGROUND OF THE INVENTION

The present invention relates to a disk drive unit mounted in a magnetic disk system, and more particularly to a detachable disk drive unit mounted in a rack of a magnetic disk system.

In a Japanese patent application laid open as a provisional publication No. 319194/'89, a detachable disk drive unit is disclosed, wherein a disk drive and a power circuit for controlling the disk drive are unitized into a disk drive unit mounted in a magnetic disk system, easily detached for changing data set or repairing a disk drive unit out of order.

In recent years, a magnetic disk system is developed having plural racks, in each of which is mounted a desired disk drive unit as mentioned above, selected according to data set stored in the disk drive unit.

FIG. 5 is an exploded view showing an example of a conventional disk drive unit to be mounted detachably in a magnetic disk system.

Referring to FIG. 5, the conventional disk drive unit comprises a chassis 53 to be mounted in a rack of a magnetic disk system (which is not illustrated here). In the chassis 53, there are contained a disk drive 60, a power circuit connector unit 54 consisting of a signal connector to be joined with a connector provided in a rack, an indicator 55 showing an operational state of the disk drive 60 and their accessories.

The disk drive 60 is fixed on a bottom face of the chassis 53 with a screw 57a from the back of the chassis 53, and the power circuit connector unit 54 is attached to a rear side of the chassis 53 with a screw 57b. The indicator 55 having a light element as a LED (Light Emitting Diode) is also fixed at a front side of the chassis 53 with a screw 57c.

The indicator 55 has connectors 56a, 56b and 56c to be connected with cables to the power circuit connector unit 54. Also, at the front side of the chassis 53, there are provided an ejector 51 for pulling out the disk drive unit from the rack, and a screw 52 for preventing the chassis 53 falling out of the rack when the disk drive unit is mounted in a magnetic disk system.

However, miniaturization of a magnetic disk system is difficult with a conventional disk drive unit having a chassis 53 comparatively large for containing connectors and cables relating the indicator 55 to the power circuit connector unit 54 besides the power circuit connector unit 54 and the disk drive 60.

In addition, there is a fear of breaking or poor contacting of the cables connecting between the indicator 55 located at the front side and the power connector unit 54 located at the rear side of the chassis 53.

SUMMARY OF THE INVENTION

Therefore, a primary object of the invention is to provide a detachable disk drive unit mounted in a magnetic disk unit of a high reliability which enables miniaturization of the magnetic disk system with high packaging density, eliminating the inconveniences of the prior art.

In order to achieve the object, in a disk drive unit for a magnetic disk system of the present invention having a disk drive controlled by a power circuit both installed on a detachable chassis mounted in a rack of the magnetic disk system, the detachable chassis includes a printed circuit board for supporting an indicator for displaying an operational state of the disk drive, and a plug-in connector to be joined to a connector provided in the bottom of the rack, in addition to the disk drive and the power circuit.

Therefore, a detachable disk drive unit mounted in a magnetic disk system of a high reliability which enables miniaturization of the magnetic disk system with high packaging density is provided in the present invention, eliminating the inconveniences of the prior art.

Furthermore, the printed circuit board of the disk drive unit of the invention is equipped with:

a lever for fitting the printed circuit board in the rack and removing the printed circuit board from the rack;

a panel with a screw for fixing said printed circuit board in the rack; and a cable for connecting the plug-in connector with the disk drive.

Therefore, the disk drive unit of the invention is easily fitted in or removed from a rack of a magnetic disk system for changing a data set or repairing a disk drive unit out of order.

BRIEF DESCRIPTION OF THE DRAWINGS

The foregoing, further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Figure 1:
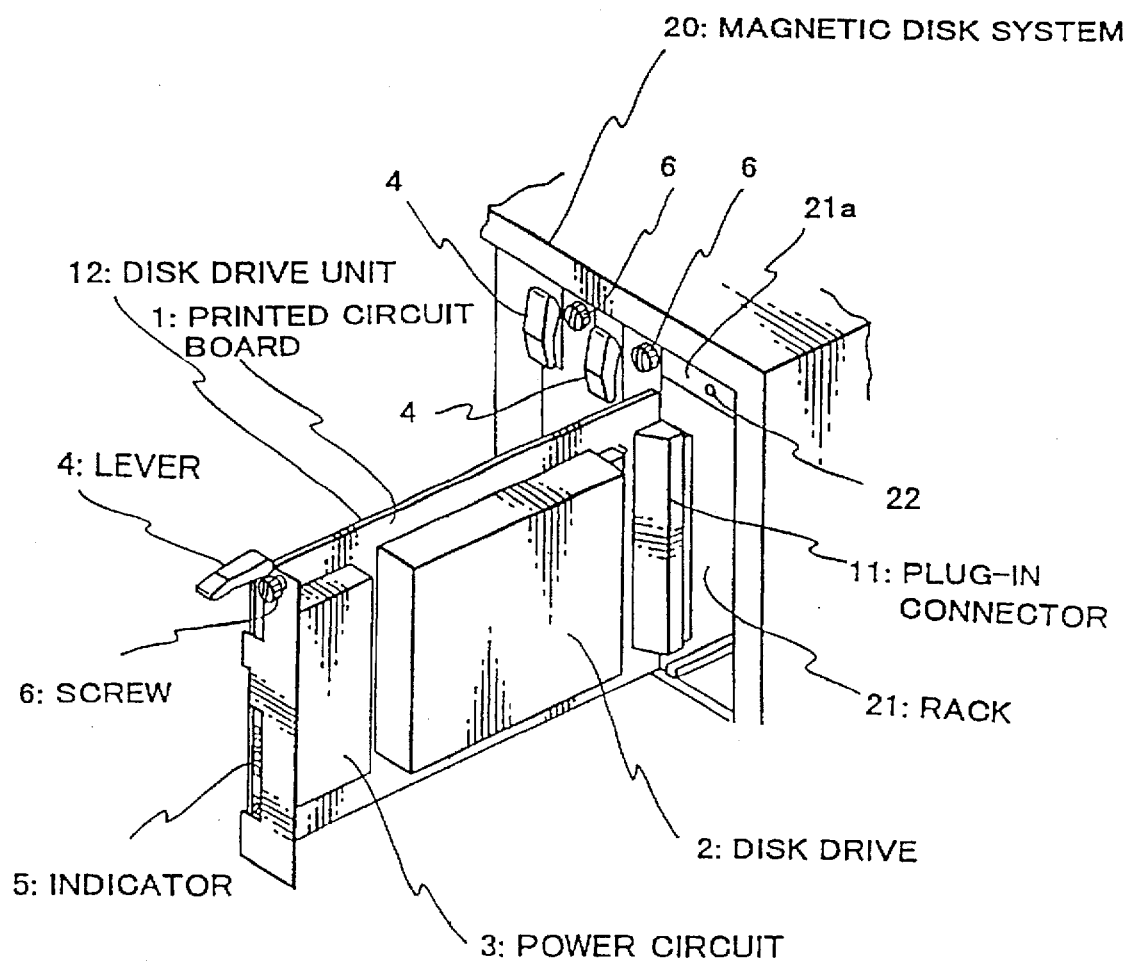
FIG. 1 illustrates a perspective view of a disk drive unit of an embodiment of the invention to be mounted in a rack of a magnetic disk system.
Figure 2:
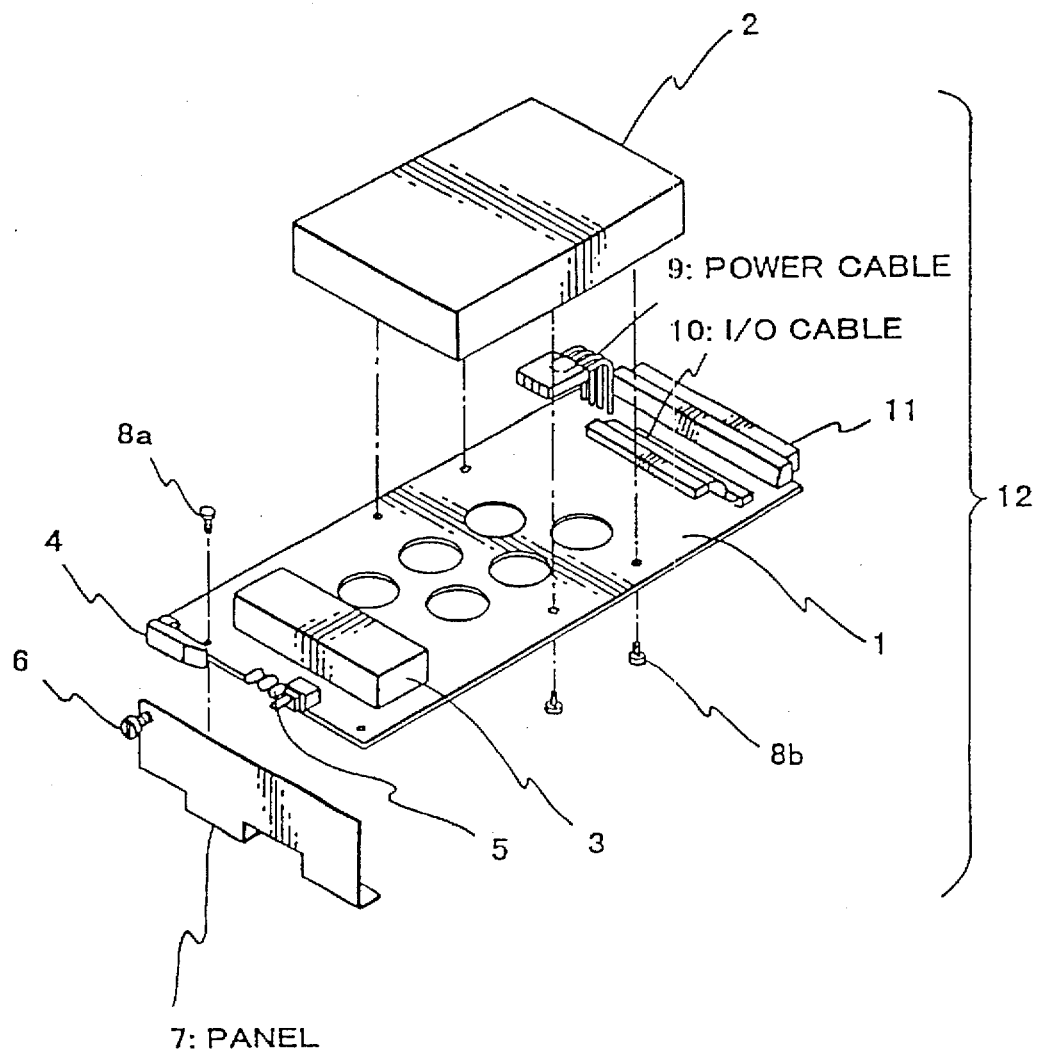
FIG. 2 illustrates a partial exploded view of the disk drive unit of FIG. 1.

FIG. 1 illustrates a perspective view of a disk drive unit 12 of an embodiment of the present invention to be mounted in a rack 21 of a magnetic disk unit 20 having plural racks for mounting plural disk drive units, and FIG. 2 is an exploded view of the disk drive unit 12 of FIG. 1.

Referring to FIG. 1 and FIG. 2, the disk drive unit 12 is provided with a single printed circuit board 1 as a unit supporter, on which are installed a disk drive 2, a power circuit 3 for driving the disk drive 2, an indicator 5 comprising a LED for displaying an operational state of the disk drive 2, a plug-in connector 11 to be joined to a connector provided in a bottom of the rack 21 of the magnetic disk system 20, a power cable 9 connecting between the plug-in connector 11 and the disk drive 2, a lever 4 for fitting the the printed circuit board 1 in rack 21 and removing it from the rack 21, and a panel 7 with a screw 6 for fixing the printed circuit board 1 in the rack 21.

The disk drive 2 is installed on the printed circuit board 1 with a screw 8b from the back of the printed circuit board 1 and supplied from a power supply of the magnetic disk system 20 through the power cable 9 connected to the plug-in connector 11.

An I/O cable 10 connects the printed circuit board 1 and the disk drive 2. Read/write data are input and output through the I/O cable 10.

The power circuit 3 and the indicator 5 installed on the printed circuit board 1 are connected directly to circuits printed on the printed circuit board 1 with no exposed wire. A panel 7 is attached to an end of the printed circuit board 1 by a screw 8a for blocking an opening of the rack 21 of the magnetic disk system 20 when the disk drive unit 12 is mounted there.

The panel 7 is fixed with a screw 6 tightened into a screw hole 22 provided at an edge of the opening of the rack 21 for preventing the disk drive unit 12 from falling out of the rack 21. The lever 4 is provided at an end, where the panel 7 is attached, of the printed circuit board 1.

Thus designed, a compact and thin disk drive unit 12 can be unitized on a chassis which includes the printed circuit board 1 with no wiring but the power cable 9 for driving the disk drive 2 and the I/O cable 10 for signal in-out.

When the disk drive unit 12 is mounted inside the rack 21 of the magnetic disk system 20, the end of the printed circuit board 1, where the plug-in connector 11 is provided, is inserted through the opening of the rack 21 for fitting the plug-in connector 11 into a connector provided in the bottom of the rack 21. For fitting the plug-in connector into the rack side connector, the printed circuit board must be pushed with a certain force. For the purpose, the lever 4 described is provided.

Now, mechanism and action of the lever 4 is described here in detail referring to FIG. 3(a)–3(c) and FIG. 4(a)–4(c). The lever 4, comprising a hooking part 4a and a pushing part 4b, is fixed able to be turned with a lever axis 4c at an end part of the printed circuit board 1.

Figure 3A:
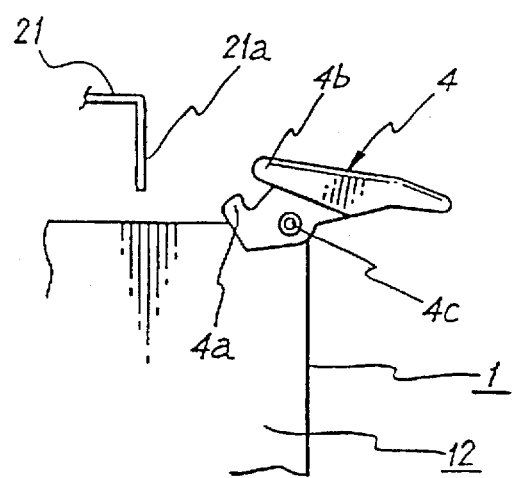
FIG. 3(a) illustrates a state of a lever for fitting and removing the disk drive unit of FIG. 1 pre-inserted in a rack.
Figure 3B:
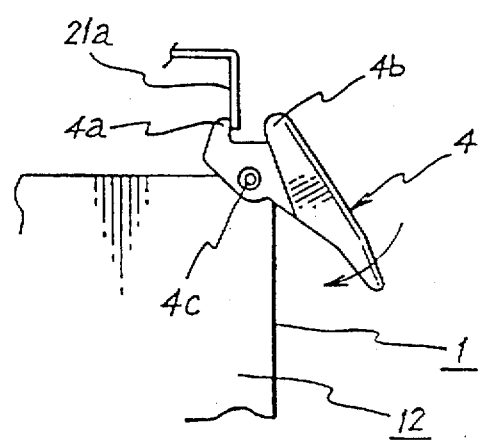
FIG. 3(b) illustrates a state of the lever for fitting and removing the disk drive unit of FIG. 1 being fitted in the rack.

When the disk drive unit 12 is mounted inside the rack 21, it is inserted through the opening of the rack 21 from its end, where the plug-in connector 11 is attached, with its lever 4 raised by a finger as shown in FIG. 3(a).

Then, the plug-in connector 11 reaching at the connector provided in the bottom of the rack 21, the lever 4 arrives at an opening edge 21a of the rack 21. Therefore, by turning the lever 4 as indicated by an arrow in FIG. 3(b), the hooking part 4a of the lever 4 touches inside of the opening edge 21a of the rack 21.

Figure 3C:
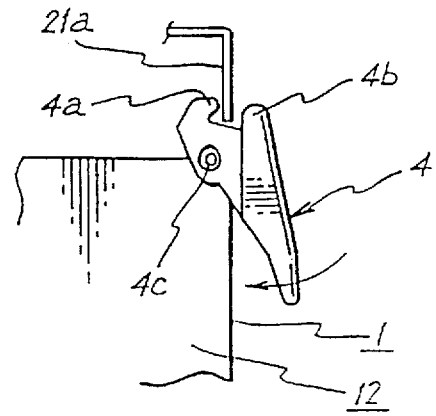
FIG. 3(c) illustrates a state of the lever for fitting and removing the disk drive unit of FIG. 1 fitted in the rack.

Then, still turning the lever 4 following the arrow, the hooking part 4a engages with the opening edge 21a and, hooking its inner side, pushes the printed circuit board 1 into the rack 21 until the plug-in connector 11 of the printed circuit board is joined to the connector at the bottom of the rack 21 as shown in FIG. 3(c). In this position, the lever 4 is parallel to a surface of the panel 7. After thus mounted in the rack 21 completely, the disk drive unit 12 is fixed in the rack 21 by the screw 6 tightened into the screw hole 22 provided at the opening edge 21a of the rack 21.

When the disk drive unit 12 is taken off the rack 21 of the magnetic disk system 20, the screw 6 fixing the panel 7 of the disk drive unit 12 at the screw hole 22 of the opening edge 21a of the rack 21 is loosened and taken out of the screw hole 22, in an inverse way of the action just described.

Figure 4A:
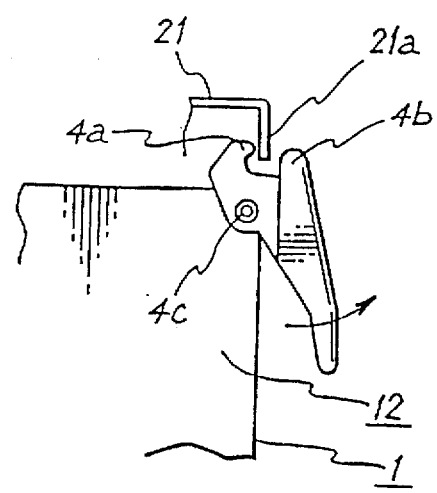
FIG. 4(a) illustrates a state of the lever for fitting and removing the disk drive unit of FIG. 1 mounted in a rack.
Figure 4B:
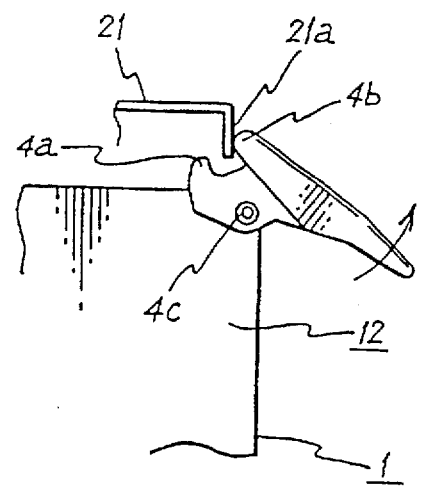
FIG. 4(b) illustrates a state of the lever for fitting and removing the disk drive unit of FIG. 1 being removed from the rack.

The position of the lever 4 in this state is parallel to the surface of the panel 7 as shown in FIG. 4(a) and the plug-in connector 11 of the disk drive unit 12 is rest joined to the connector at the bottom of the rack 21. By turning up the lever 4 by a finger in the direction of an arrow in FIG. 4(b), its pushing part 4b touches outside of the opening edge 21a of the rack 21, as shown in FIG. 4(b).

By still turning up the lever 4 following the arrow, the pushing part 4b pushes outside of the opening edge 21a, and the printed circuit board 1 of the disk drive unit 12 is pulled up from the rack 21, the plug-in connector 11 of the printed circuit board 1 being withdrawn from the connector at the bottom of the rack 21.

Figure 4C:
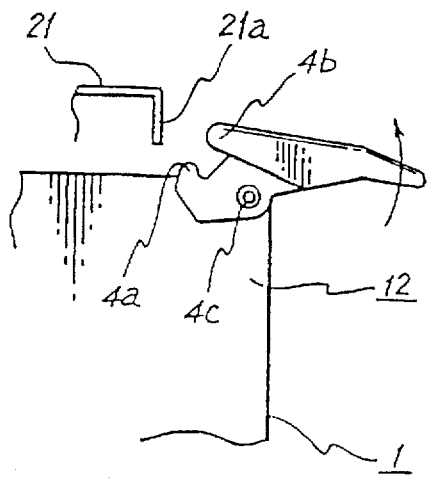
FIG. 4(c) illustrates a state of the lever for fitting and removing the disk drive unit of FIG. 1 removed from the rack.
Figure 5:
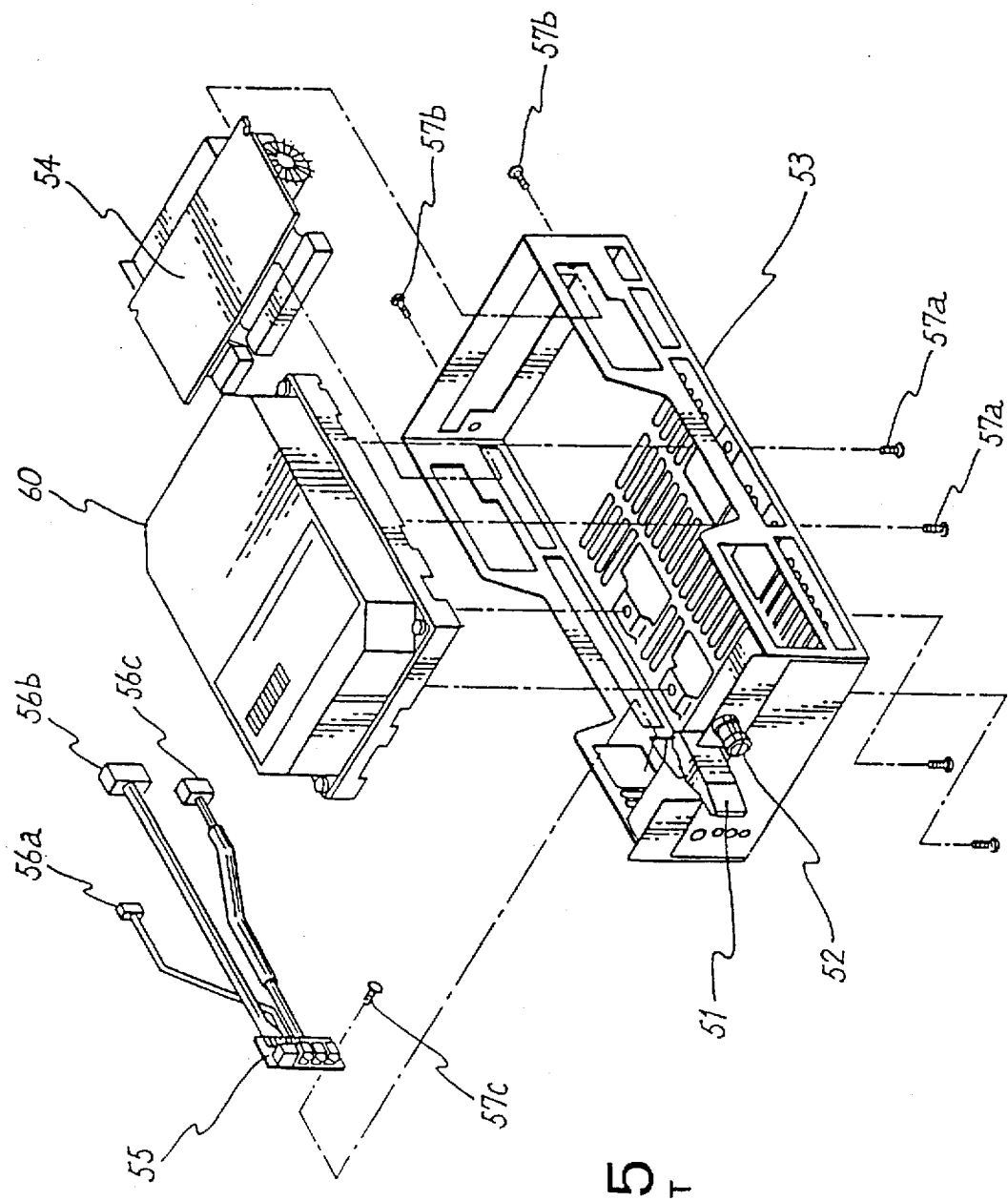
FIG. 5 is an exploded view showing an example of a conventional disk drive unit.

Once the plug-in connector 11 is extracted from the rack side connector, the disk drive unit 12 can be removed easily by pulling out the raised lever 4 with fingers, as shown in FIG. 4(c).

Thus, a detachable disk drive unit mounted in a magnetic disk system of a high reliability and a practical use which enables miniaturization of the manetic disk system with high packaging density is provided in the present invention.

Heretofore, an embodiment provided with only a lever 4 at a side of the end of the printed circuit board 1 is described. However, another lever may be provided also at the other side of the end the printed circuit board 1 for still facilitating the attachment and detachment of the disk drive unit 12 into the rack 21. And further, the embodiment described above has a lever 4 to be turned around a lever axis 4c, but it is apparent that any type of lever, a pull type or a knob type lever for example, can be applied in the scope of the invention.

What is claimed is:

1. A disk drive unit for a magnetic disk system, comprising:

a printed circuit board having an I/O cable extending from a top surface of the printed circuit board, and having a power cable extending from the top surface of the printed circuit board;

a disk drive detachably mounted onto the top surface of the printed circuit board, wherein the I/O cable is connected to an input port of the disk drive;

a power unit integrally mounted onto the top surface of the printed circuit board; and at least one indicator light integrally mounted onto the top surface of the printed circuit board adjacent to a first edge of the printed circuit board, so as to provide a visible indication of status of the printed circuit board when the printed circuit board is mounted into a rack of the magnetic disk system;

a plug-in connector integrally mounted onto the top surface of the printed circuit board adjacent to a second edge of the printed circuit board, the plug-in connector configured to be joined to a connector provided in the rack when the printed circuit board is mounted into the rack; and at least one lever mounted onto the top surface of the printed circuit board adjacent to the first edge of the printed circuit board, the lever including, a hooking part for engaging with an inner edge of an entrance of the rack so as to maintain said printed circuit board in said rack in a stable condition; and a pushing part for engaging with an outer edge of the entrance of the rack when pushed, so as to allow for removal of the printed circuit board from the rack.

* * * * *